United States Patent
Gratton (10) Patent No.: US 9,154,721 B2
(45) Date of Patent: Oct. 6, 2015

(54) APPARATUS AND METHODS FOR RECORDING ADJACENT TIME SLOTS OF TELEVISION PROGRAMMING ON THE SAME CHANNEL

(75) Inventor: Max Stephen Gratton, Lakewood, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 1594 days.

(21) Appl. No.: 12/411,521

(22) Filed: Mar. 26, 2009

(65) Prior Publication Data

US 2010/0247067 A1 Sep. 30, 2010

(51) Int. Cl.
| | |
|---|---|
| H04N 5/76 | (2006.01) |
| H04N 5/781 | (2006.01) |
| H04N 21/4147 | (2011.01) |
| H04N 21/432 | (2011.01) |
| H04N 21/433 | (2011.01) |
| H04N 21/458 | (2011.01) |
| H04N 21/472 | (2011.01) |
| H04N 21/845 | (2011.01) |

(52) U.S. Cl.
CPC .............. *H04N 5/76* (2013.01); *H04N 5/781* (2013.01); *H04N 21/4147* (2013.01); *H04N 21/4325* (2013.01); *H04N 21/4334* (2013.01); *H04N 21/4583* (2013.01); *H04N 21/47214* (2013.01); *H04N 21/8455* (2013.01)

(58) Field of Classification Search
CPC ................................. H04N 5/00; H04N 21/00
USPC ............................................................ 386/83
See application file for complete search history.

(56) References Cited

U.S. PATENT DOCUMENTS

| | | | | |
|---|---|---|---|---|
| 2002/0081096 | A1* | 6/2002 | Watanabe et al. | 386/83 |
| 2006/0120688 | A1* | 6/2006 | Uchida | 386/83 |

FOREIGN PATENT DOCUMENTS

| | | |
|---|---|---|
| CA | 2726548 | 12/2013 |
| DE | 2351363 | 5/2013 |
| EP | 1768399 A2 | 3/2007 |
| EP | 2351363 | 8/2011 |
| MX | 309972 B | 3/2013 |
| NL | 2351363 | 5/2013 |
| WO | WO 03/034426 A1 | 4/2003 |
| WO | 2010/11239 A2 | 9/2010 |

OTHER PUBLICATIONS

PCT, International Search Report and Written Opinion of the International Search Authority, Oct. 6, 2010.
International Preliminary Report on Patentability for PCT/US2010/028266 issued Sep. 27, 2011, 6 pages.
International Search Report and Written Opinion for PCT/US2010/028266 mailed Oct. 6, 2010, 9 pages.

* cited by examiner

*Primary Examiner* — Huy T Nguyen
(74) *Attorney, Agent, or Firm* — Kilpatrick Townsend & Stockton LLP (57) ABSTRACT

Various embodiments described herein provide techniques for a DVR to utilize the same data stream to record multiple events with adjacent time slots simultaneously. A DVR is configured to recognize when two recording timers for programs on the same channel overlap. Content for each program may be stored in separate event files on the DVR or the content in one event file may be linked with the content in another event file. Thus, overlapping content may be accessed through either of the event files.

17 Claims, 5 Drawing Sheets

APPARATUS AND METHODS FOR RECORDING ADJACENT TIME SLOTS OF TELEVISION PROGRAMMING ON THE SAME CHANNEL

BACKGROUND

Digital video recorders (DVRs) allow users to record television programs for later viewing. Typically, users set recording timers to record particular television programs at specified times. The DVR records a particular channel during a specified time slot corresponding with the program, e.g., 7:00 to 8:00. In order to account for programs that start earlier or that end later than the designated time slot, DVRs often start recording earlier or end recording later than the scheduled time of the program, providing a time buffer of several minutes on each side of the time slot. The additional recording time on either side of a scheduled time slot may be referred to herein as a "time buffer". For example, the DVR may begin recording at 6:57 for an event scheduled to start at 7:00 and may continue recording until 8:03 if the event is scheduled to end at 8:00. Thus, the DVR does not miss recording the beginning or ending of the program.

In an environment in which a tuner is utilized to record multiple events in adjacent time slots, a DVR is often unable to provide a recording time buffer for one or more of the programs. For example, if the DVR is utilized to record a first program from 6:30 to 7:00 and a second program from 7:00 to 8:00, then there will be no ending time buffer of content in the event file for the first program. Similarly, there will be no beginning time buffer of recording in the event file for the second program. Thus, the event file for a particular program may not include the beginning or ending of the program.

Even when the adjacent time slots are on the same channel, the event files for each program may be missing the beginning or ending of the associated program, which is often located in another event file. Thus, to view a particular program, the user may need to access multiple files, leading to inconvenience to the user. For example, the user may open a first event file and realize that the program was already in progress when the DVR began recording content to the first event file. Thus, the beginning of the program may be contained in a second event file. The user then opens the second event file, watches a minute of two of programming in the second event file to see the beginning of the program and then reopens the first event file to watch the rest of the program. A bigger problem arises if the user does not realize that a program is spread across multiple event files and deletes one of the event files before watching the program, missing out on viewing the beginning or ending of the program contained in the deleted event.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the reception, processing, and outputting of content from one or more sources for presentation to end-users. More particularly, the various embodiments described herein provide techniques for a DVR to utilize the same data stream to record multiple events with adjacent time slots simultaneously. A DVR is configured to recognize when two recording timers for programs on the same channel overlap. Content for each program may be stored in separate event files on the DVR and the overlapping content may be accessed through either of the event files. In short, the various embodiments described herein provide systems, methods and apparatus for recording programs from adjacent time slots on the same channel.

In at least one embodiment, overlapping portions of content associated with two different recording timers may be stored separately as part of two different event files for two different programs. For example, a first program may be broadcast from 6:30 to 7:00 and the associated recording timer may be configured to record from 6:27 to 7:03. A second program may be broadcast from 7:00 to 8:00 and the associated recording timer may be configured to record from 6:57 to 7:33. The DVR stores content in the video stream associated with the channel from 6:27 to 7:03 in a first file and stores the content in the video stream from 6:57 to 7:33 in a second file. Thus, the overlapping content, from 6:57 to 7:33, is stored twice on the DVR in two different files.

In at least one embodiment, the DVR stores the overlapping content in the separate files for each event simultaneously. In other words, during the overlapping time period associated with the events, the DVR stores the received information twice into two separate files. In at least one embodiment, the DVR initially stores the overlapping information in either of the files and then subsequently copies the overlapping information into the second file. For example, the DVR may store data from 6:27 to 7:03 in a first file and may store data from 7:03 to 7:33 in a second file. Subsequently, the data from 6:57 to 7:03 may be copied from the first file to the second file, completing storage of data in the second file. The copying process may proceed at any time during the recording of the second program or after completion of recording of the second program.

Similarly, the first file may include data from 6:27 to 7:00 and the second file may include data from 7:00 to 7:33. Subsequent copying processes may then transfer the overlapping data between both files. For example, the data covering the time period from 6:57 to 7:00 may be copied from the first file to the second file. The data covering the time period from 7:00 to 7:03 may be copied from the second file to the first file.

In some circumstances, it may be desirable to store the overlapping content on the storage medium of the DVR once and automatically make the data accessible to the user when accessing either event file. Because the data is not duplicated on the storage medium, there is more capacity available to record other programming. In at least one embodiment, the overlapping content is stored in a first file during the recording process and accessible from either event file. A second file may include a pointer to the overlapping portion of content stored in the first file. Thus, when a user accesses the second file during playback, the DVR will playback the overlapping portion of content stored in the first file as well as the content stored in the second file.

For example, the first file may include the earlier broadcasted program and the second file may include the later broadcasted program. The overlapping content from 6:57 to 7:00 may be stored in the first file. When the user selects to view the content of the second file, the DVR may initially begin playback of the overlapping data in the first file. Once the playback of the overlapping portion of content from the first file has commenced, the DVR begins playback from content of the second file.

Similarly, overlapping content from 7:00 to 7:03 may be stored in the second file. When the user selects to view the event file, the DVR outputs the content in the first file. After reaching the end of content in the first file, the DVR begins playing back the first three minutes of content in the second file. Thus, the user is seamlessly provided with playback of all of the data associated with the recording timer without having to access multiple event files to view the data. This gives the user the appearance that the content associated with a recording timer was not truncated because of an adjacent recording timer, even though the data is stored in multiple event files.

Figure 1:
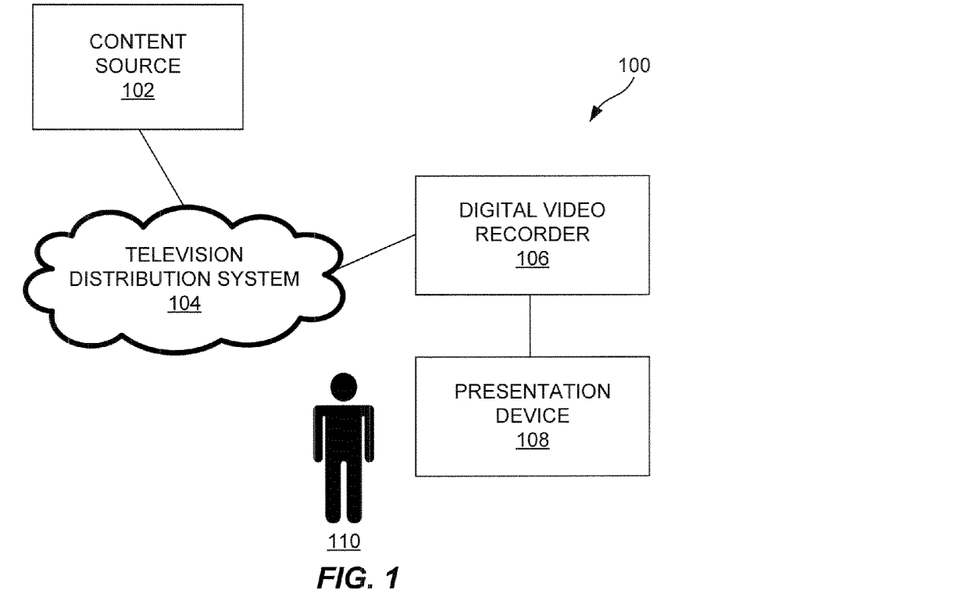
FIG. 1 illustrates an embodiment of a communication network.

FIG. 1 illustrates an embodiment of a communication network 100. The communication network includes a content source 102, a television distribution system 104, a DVR 106 and a presentation device 108. Each of these components will be discussed in greater detail below. The communication network 100 may include other components, elements or devices not illustrated for the sake of brevity.

The content source 102 is operable for receiving, generating and communicating content to one or more DVRs 106. The content to be received, processed, outputted and/or communicated may come in any of various forms including, but not limited to, audio, video, data, information, or, otherwise. In at least one embodiment, the content source 102 is operable for receiving various forms and types of content from other sources, aggregating the content and transmitting the content to the DVR 106 through the television distribution system 104. It is to be appreciated that the content source 102 may receive practically any form and/or type of information from one or more sources including streaming television programming, recorded audio or video, electronic programming guide data and the like.

The television distribution system 104 is operable to transmit content from the content source 102 to the DVR 106. The television distribution system 104 may comprise any type of wired (e.g., cable and fiber) and/or wireless (e.g., cellular, satellite, microwave, and other types of radio frequency) communication medium and any desired network topology (or topologies when multiple mediums are utilized). Exemplary television distribution systems 104 include terrestrial, cable, satellite and internet protocol television (IPTV) distribution systems. In at least one embodiment, the television distribution system 104 broadcasts or multicasts content to a plurality of television receivers, e.g., DVR 106. The television distribution system 104 may also distribute content to a specific addressable television receiver, e.g., DVR 106, such as video-on-demand and the like. In at least one embodiment, the content source 102 may be embodied as a transmission facility of the television distribution system 104. Exemplary content sources 102 include over-the-air (OTA) terrestrial transmission facilities, cable television distribution headends, satellite television uplink centers, broadband or internet servers and the like.

The DVR 106 is operable to receive content from the television distribution system 104 and store the received content for subsequent presentation to the user 110. The DVR 106 is further operable to output the received and/or stored content for presentation by the presentation device 108. In at least one embodiment, the presentation device 108 is a display device (e.g., a television) configured to display content to a user 110. The DVR 106 may receive an audio/video stream in any format (e.g., analog or digital format), and store and output the audio/video stream for presentation by the presentation device 108. In at least one embodiment, the DVR 106 may be integrated with a television receiver, such as a satellite, cable, over-the-air, broadband or other type of television receiver that receives and demodulates television signals that are outputted for display on a display device (e.g., a television). As used herein, a television receiver or DVR may also be referred to as a set-top box, which is a television receiver that is located externally with respect to a display device. The DVR 106 may be further configured to output menus and other information that allow a user 110 to control the output of audio/video content by the DVR 106, view electronic programming guides (EPGs), set recording timers and the like. In some embodiments, the DVR 106 and the presentation device 108 may be integrated as a device combining the functionality of a display device and television receiver/DVR or the like.

Responsive to particular recording timers, the DVR 106 coordinates the reception of video signals associated with a television program through a television receiving resource (e.g., a television tuner) and storage of the video signal onto a storage medium (e.g., a hard drive or Flash memory). The DVR 106 may include any number of television receiving resources utilized for receiving television programs. A DVR 106 minimally includes at least one television receiving resource to receive and record video signals associated with a television program. The DVR 106 may include multiple television receiving resources to record multiple television programs simultaneously. For example, the DVR 106 may include two or more tuners that allow recording and/or viewing of multiple programs though the DVR 106 simultaneously. In at least one embodiment, the DVR 106 may include multiple types of television receiving resources, such as an over-the-air (OTA) tuner and a satellite and/or cable television tuner that may be utilized to receive and/or record programs from multiple sources.

In at least one embodiment, recording timers may have a longer duration than a scheduled time slot of an associated television program. For example, a television program broadcast from 7:00 to 8:00 may be associated with a recording timer that spans from 6:57 to 8:03. Thus, if the television program starts a few minutes early, runs a few minutes late or the time of the DVR 106 is not synchronized exactly with the content source 102, then the DVR 106 will still record the entirety of the program.

If two recording timers assigned to the same television receiving resource are scheduled in adjacent time slots, then the time buffer for one or both programs may not be available. This is because a single television tuner cannot typically receive different data streams, carried on different channels, simultaneously. Because the time buffer is considered optional under the settings of many DVRs, a DVR will typically place priority on recording a scheduled television program during its associated time slot over recording a time buffer for another television program. Thus, the DVR may truncate the beginning and/or ending time buffer from a scheduled recording timer to accommodate the recording of the other television program in an adjacent time slot.

For example, a DVR may be configured to record a first program broadcast from 6:30 to 7:00 on a first channel and a second program broadcast from 7:00 to 8:00 on a second channel. If the same television receiving resource is utilized to record both programs, then the ending time buffer of the first program, from 7:00 to 7:03 may not be recorded by a DVR. Thus, if the first program runs past 7:00, then a DVR may miss recording the end of the first program. Similarly, the beginning time buffer of the second program, from 6:57 to 7:00 may not be recorded by a DVR. Thus, if the second program starts before 7:00, then a DVR may miss recording the beginning of the second program.

When recording adjacent programs on the same channel, the ending time buffer of the first program corresponds with part of the content for the second program. Similarly, the beginning time buffer for the second program corresponds with part of the content for the first program. Thus, the television receiving resource is not required to receive different data streams from the content source 102 to satisfy both recording timers and the DVR 106 may be configured to associate the overlapping content with both event files, allowing the user 110 to seamlessly access a recorded program, as well as both an beginning and ending time buffers of content associated with the program.

Figure 2:
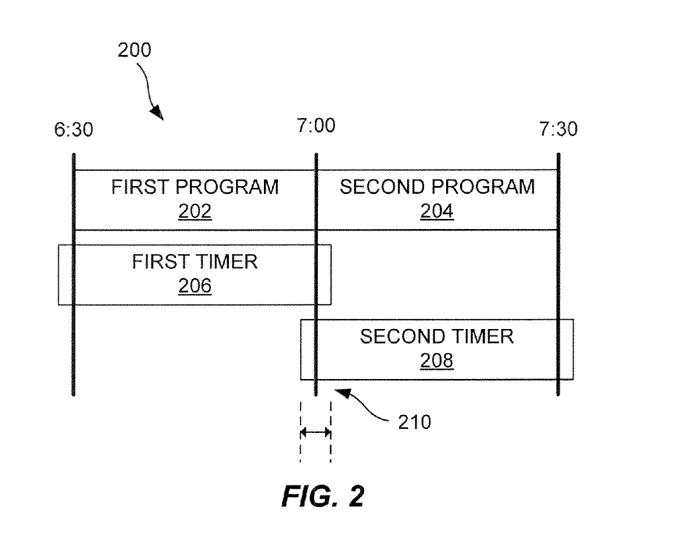
FIG. 2 illustrates an embodiment of a time schedule for programs recorded by the DVR of FIG. 1.

FIG. 2 illustrates an embodiment of a time schedule 200 for programs recorded by the DVR 106 of FIG. 1. The time schedule 200 will be described in reference to the communication network 100 of FIG. 1. As illustrated in the time schedule 200, a first program 202 is scheduled for broadcast from 6:30 to 7:00 on a channel. A second program 204 is scheduled for broadcast from 7:00 to 7:30 on the same channel.

The user 110 sets up a first timer 206, associated with the first program 202, instructing the DVR 106 to record the content of the channel between 6:27 and 7:03. Similarly, the user 110 sets up a second timer 208, associated with the second program 204, instructing the DVR 106 to record the content of the channel between 6:57 and 7:33. The ending time of the first timer 206 is after the beginning of the second timer 208. Thus, the first timer 206 and the second timer 208 overlap during the time period 210.

In at least one embodiment, the DVR 106 identifies that the first timer 206 and the second timer 208 overlap and further identifies that both timers 206 and 208 are associated with content from the same channel. Thus, the DVR 106 determines that the first timer 206 should include its associated ending time buffer and the second timer 208 should include its beginning time buffer. In at least one embodiment, the DVR 106 stores the content broadcast on the channel during the overlapping time period 210 into files associated with both the first and second programs 202 and 204. Thus, the overlapping content is resident on the DVR 106 twice and may be accessed through playback of either program 202 or 204.

In another embodiment, data corresponding with the overlapping time period 210, or portions thereof, may be stored in an event file corresponding with one of the first program 202 and the second program 204. The data corresponding with the overlapping time period 210 may then be associated with the other event file such that the DVR 106 playbacks the entire content associated with the first timer 206 or the second timer 208 when an associated event is requested for playback by the user 110.

Figure 3:
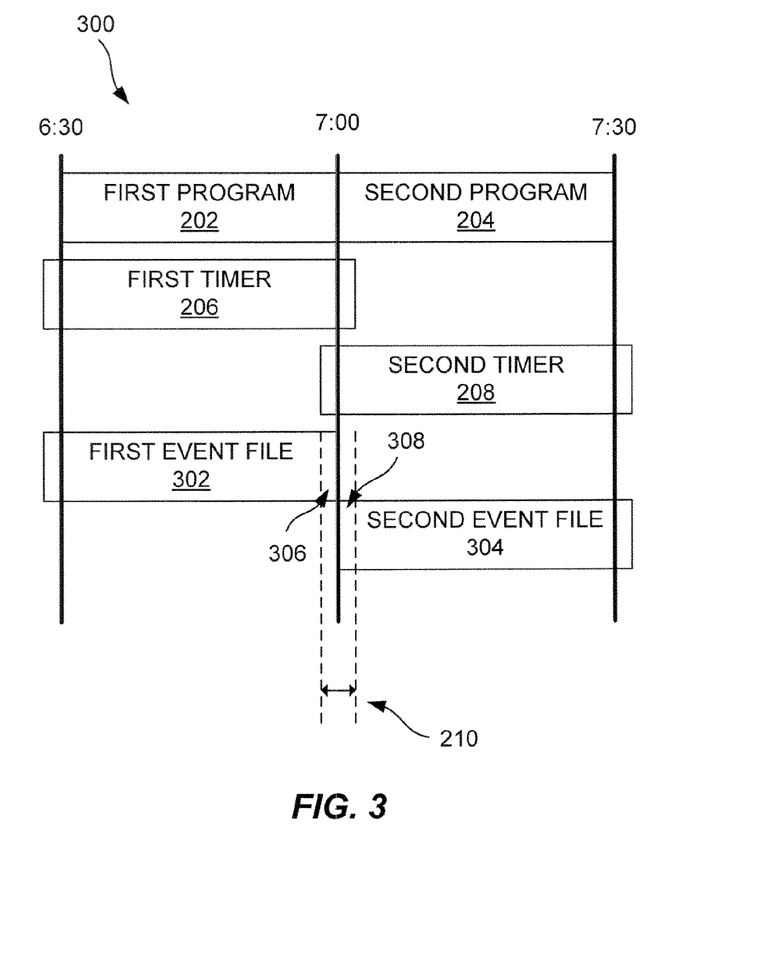
FIG. 3 illustrates an embodiment of a time schedule illustrating the associated time events for the programs recorded by the DVR of FIG. 1.

FIG. 3 illustrates an embodiment of a time schedule 200 illustrating the associated time events for the programs recorded by the DVR 106 of FIG. 1. The time schedule 300 will be described in reference to the communication network 100 of FIG. 1. As illustrated in the time schedule 300, the content associated with the first program 202 is recorded into a first event file 302. The first event file 302 includes content broadcast from 6:27 to 7:00. Similarly, content associated with the second program 204 is recorded into a second event file 304. The second event file 304 includes content broadcast from 7:00 to 7:33.

Portions of the overlapping time period 210 are stored in both the first event file 302 and the second event file 304. More particularly, a first portion 306 of content associated with the overlapping time period 210 is stored in the first event file 302 and a second portion 308 of content associated with the overlapping time period 210 is stored in the second event file 304. Further, the first event file 302 includes a pointer to the second portion 308 of content stored in the second event file 304. Similarly, the second event file 304 includes a pointer to the first portion 306 of content stored in the first event file 302.

During playback of the first program 202, then DVR 106 outputs the content stored in the first event file 302 followed by the second portion 308 of the content stored in the second event file. In at least one embodiment, after the DVR 106 reaches the end of the second portion 308, the DVR 106 stops playback and may inform the user 110 that playback of the first program 202 has commenced.

Similarly, if the user 110 selects to view the second program 204, then the DVR 106 initially outputs the first portion 306 of the content in the first event file 302. The DVR 106 then outputs the content in the second event file 304, allowing the user 110 to view all of the content spanning the second timer 208.

In some scenarios, the user 110 may desire to delete the first event file 302 without deleting the second event file 304 or vice versa. For example, the user 110 provides input to the DVR 106 requesting to delete the first event file 302. The DVR 106 identifies that the first and second event files 302 and 304 are linked and determines whether the second event file 304 has been deleted. In at least one embodiment, the DVR 106 informs the user 110 that the first event file 302 cannot be deleted until the second event file 304 has been deleted. In another embodiment, the DVR 106 retains the first portion 306 of content in the first event file 302 and deletes the remaining portion of the first event file 302 responsive to the request from the user 110. The first portion 306 may then be stored separately from the second event file 304 or may be merged with the second event file 304 depending on desired design criteria. If the second event file 304 is then subsequently deleted, then the first portion 306 may then be deleted as well, as it is no longer needed.

Figure 4:
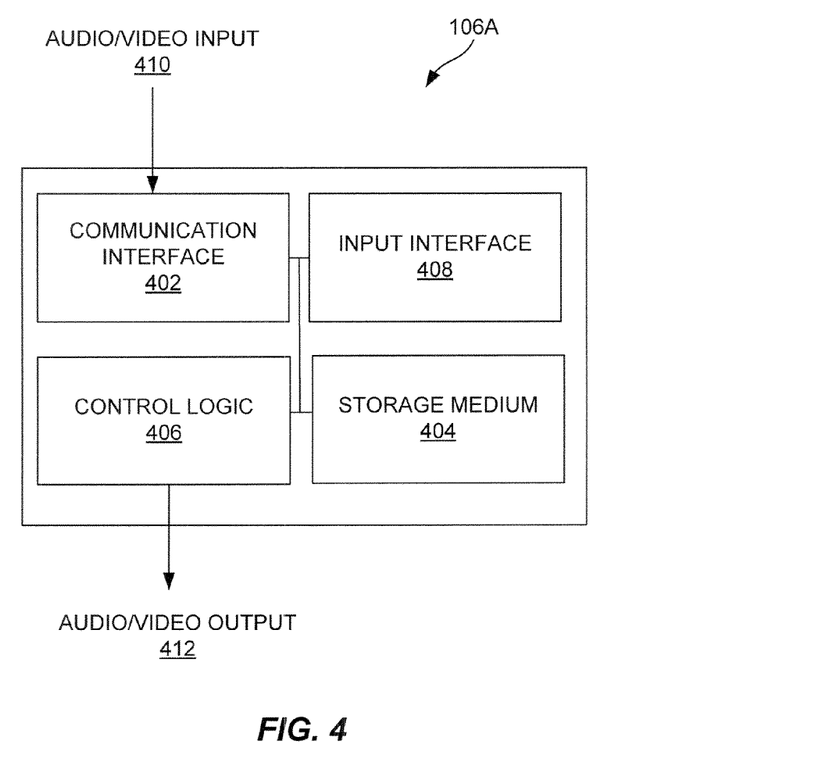
FIG. 4 illustrates an embodiment of a DVR of FIG. 1.

FIG. 4 illustrates an embodiment of a DVR of FIG. 1. FIG. 4 will be discussed in reference to the communication network 100 illustrated in FIG. 1. The DVR 106A includes a communication interface 402, control logic 406, an input interface 408 and a storage medium 404. Each of these components will be discussed in greater detail below. The DVR 106A may include other elements, components or devices which are not illustrated for the sake of brevity.

The communication interface 402 is operable to receive an audio/video input 410 from the content source 102. More particularly, in at least one embodiment, the communication interface 402 receives and tunes a television signal including television programming. The communication interface 402 may receive an over-the-air (OTA) broadcast, a direct broadcast satellite signal, a cable television signal or an internet protocol television (IPTV) signal and tune the audio/video input 410 to extract the selected television programming. In at least one embodiment, the communication interface 402 may comprise multiple tuners, utilized by the DVR 106A to output and/or record multiple television programs simultaneously.

The storage medium 404 is operable to persistently store video signals recorded by the DVR 106A. The storage medium 404 may comprise any type of non-volatile memory appropriate for storing video signals recorded by the DVR 106A. Exemplary storage mediums 404 include hard drives (e.g., magnetic memory), flash memory, battery backed up memory and the like. In at least one embodiment, the storage medium 404 may be internally located within the DVR 106A. In other embodiments, the storage medium 404 may be located external with respect to the DVR 106A. The DVR 106A may also utilize a combination of internal and external storage mediums 404 for storage of video signals.

The input interface 408 is operable to wirelessly receive data from a remote control (not shown in FIG. 4). The input interface 408 may communicate with a remote control utilizing any type of IR or RF communication link. In at least one embodiment, the input interface 408 receives a key code from a remote control (not shown in the Figures) and responsively provides the key code to the control logic 406 for processing. In some embodiments, the input interface 408 may receive positional information from a scrolling device of the remote control 106, e.g., a touch pad, scroll wheel or the like. The data received from the remote control may be utilized by the control logic 406 to control the output of content by the control logic 406. Some of the data received by the input interface 408 may request to view electronic programming guide data, menus and the like.

The control logic 406 is operable to control the operation of the DVR 106A. The control logic 406 may be a single processing device or a plurality of processing devices that cooperatively operate to control the operation of the DVR 106A. The control logic 406 may include various components or modules for processing and outputting audio/video content. Exemplary components or modules for processing audio/video content include a demodulator, a decoder, a decompressor, a conditional access module and a transcoder module.

The control logic 406 coordinates storage of the audio/video input 410 onto the storage medium 404. More particularly, the control logic 406 operates responsive to recording timers configured on the DVR 106A to command the communication interface 402 to receive content from a specified channel and coordinates storage of the content onto the storage medium 404.

In at least one embodiment, the control logic 406 is operable to generate an audio/video output 412 based on the audio/video input 410, e.g., pass through the signal for display by an associated presentation device 108. The control logic 406 is also operable to retrieve stored video content from the storage medium 404 to generate an audio/video output 412 for display by the presentation device 108. The presentation device 108 then presents the audio/video output 412 to the user 110. The control logic 406 may incorporate circuitry to output the audio/video streams in any format recognizable by the presentation device 108, including composite video, component video, Digital Visual Interface (DVI), High-Definition Multimedia Interface (HDMI), 1394 and WiFi The control logic 406 may also incorporate circuitry to support multiple types of these or other audio/video formats. In at least one embodiment, as described above, the DVR 106A may be integrated with the presentation device 108, and the control logic 406 may be operable to control the presentation of the audio/video output 212 by the presentation device 108.

To coordinate the storage of the audio/video input 410, the control logic 406 is operable to receive user input requesting to record one or more television programs. The control logic 406 responsively sets recording timers associated with the television programs. In some embodiments, the control logic 406 is further operable to output user interface menus and other information to allow the user 110 to view the recording timers, modify recording timers and identify recording conflicts.

In at least one embodiment, the user 110 provides input requesting to record programs in adjacent time slots. More particularly, the programs are broadcast on the same channel back-to-back on the programming schedule. The control logic 406 identifies a first timer associated with a first program on the channel. The control logic 406 also identifies a second timer associated with a second program on the channel. The first timer has a first beginning time and a first ending time and the second timer has a second beginning time and a second ending time. The second beginning time occurs temporally before the first ending time and the second ending time occurs temporally after the first ending time.

Responsive to identifying the recording timers, the control logic 406 determines whether the recording timers are associated with the same channel. If the recording timers are associated with the same channel, then the control logic 406 further determines that each recording timer may include associated time buffers, even though such buffers would cause a recording conflict due to the overlapping of the recording timers. Thus, the control logic 406 coordinates the recording of the audio/video input 410 into a first file of the storage medium between the first beginning time and the first ending time. The control logic 406 also coordinates the recording of the audio/video input 410 into a second file of the storage medium between the second beginning time and the second ending time.

In at least one embodiment, the overlapping content may be stored simultaneously into both files. In at least one embodiment, the overlapping content may be stored into one file during the recording process as the content is being received and may be subsequently copied into the other file. For example, the control logic 406 may record the audio/video input 410 between the first beginning time and the first ending time into a first file on the storage medium 404. The control logic 406 may also record the audio/video input 410 between the first ending time and the second beginning time into a second file on the storage medium 404. The control logic 406 may coordinate copying of a portion of the first file, corresponding with the video stream between the second beginning time and the second ending time, into the second file. This may be done for example following the second ending time. However, it is to be appreciated that the copying may be performed at other times, such as during the recording of the video stream between the first ending time and the second ending time.

The DVR 106A may also be configured to operate as described above where the overlapping content is stored once on the storage medium 404 and event files contain pointers to content stored in other event files. Thus, responsive to a playback request for a particular program, the control logic 406 may coordinate playback of content associated with the recording timer for the program from multiple event files.

Figure 5:
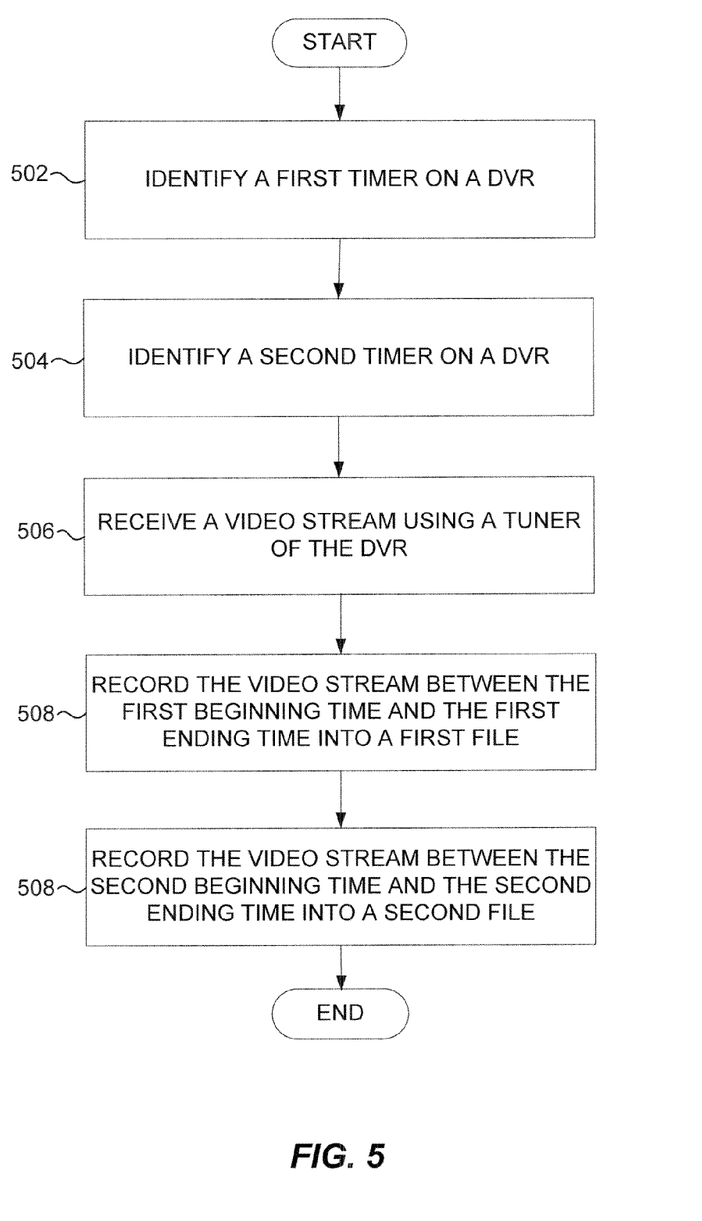
FIG. 5 illustrates a process for recording multiple television programs.

FIG. 5 illustrates a process for recording multiple television programs. More particularly, FIG. 5 illustrates a process for recording television programs in adjacent time slots on the same channel. The process of FIG. 5 operates to store overlapping content for two programs into two separate event files on a DVR. The process of FIG. 5 may include other operations not illustrated for the sake of brevity.

The process includes identifying a first timer on a DVR (operation 502). The first timer is associated with a channel and has a first beginning time and a first ending time. In at least one embodiment, the first timer is associated with a first television program broadcast during a first time slot.

The process further includes identifying a second timer (operation 504). The second timer is associated with the channel and has a second beginning time and a second ending time. The second beginning time occurs temporally before the first ending time and the second ending time occurs temporally after the first beginning time. In at least one embodiment, the second timer may be associated with a second television program broadcast during a second time slot. The first beginning time may occur after an ending of the first time slot and the second beginning time may occur before a start of the second time slot, leading to overlapping of the recording timers associated with the programs.

The process further includes receiving a video stream using a tuner of the DVR (operation 506). The process further includes recording the video stream between the first beginning time and the first ending time into a first file (operation 508) and recording the video stream between the second beginning time and the second ending time into a second file (operation 510). The process may then optionally include receiving a request to playback either the first program or the second program and outputting the content from the event file associated with the selected program for viewing by a user. Advantageously, the user may access all of the content associated with a particular recording timer by opening one event file.

Figure 6:
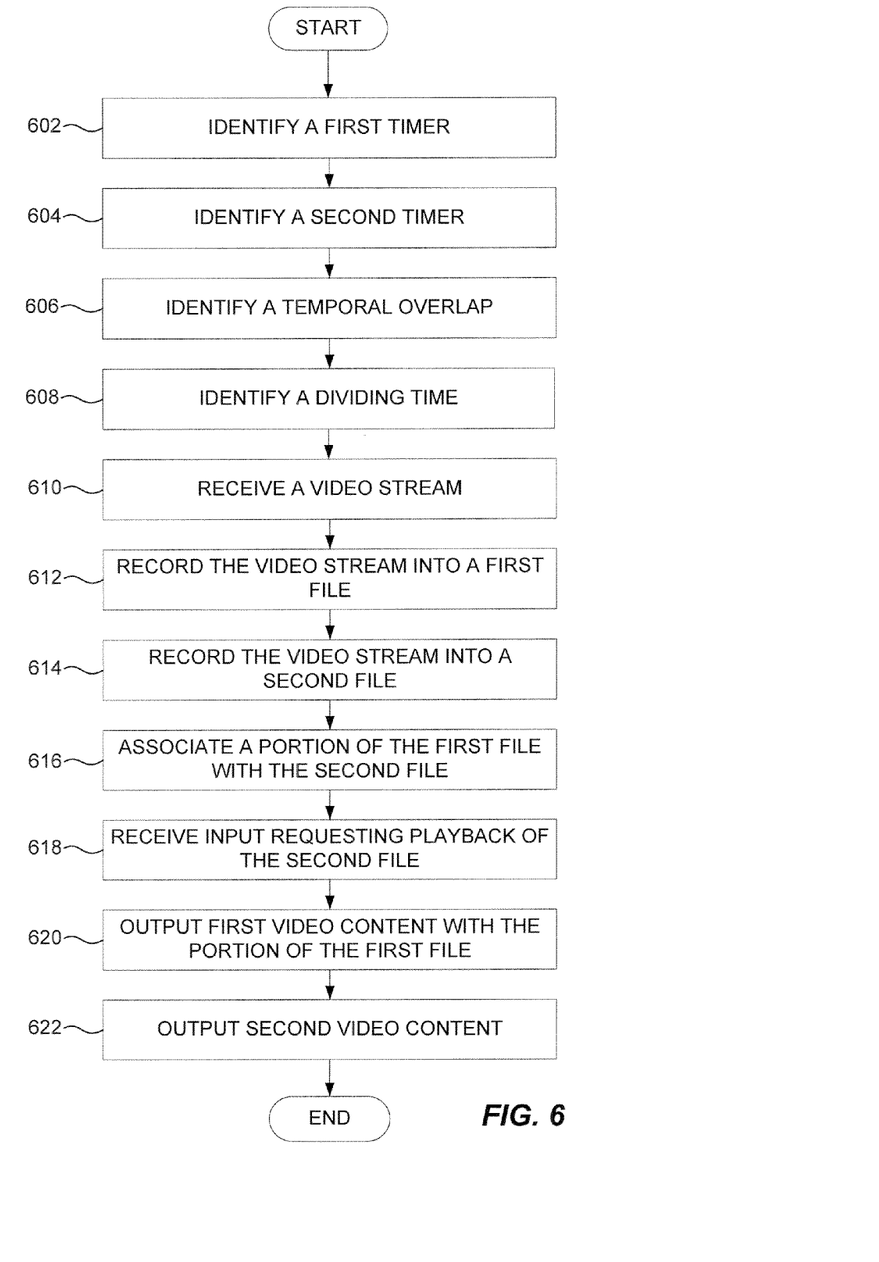
FIG. 6 illustrates another process for recording multiple television programs.

FIG. 6 illustrates another process for recording multiple television programs. The process of FIG. 6 operates to record overlapping content associated with multiple event files into one of the files and associating the overlapping content with the other event file during playback. Operations 602 to 616 are performed to record programs and operations 618 to 622 are performed to playback either of the recorded programs. The process of FIG. 6 may include other operations not illustrated for the sake of brevity.

The process includes identifying a first timer on a DVR (operation 602). The first timer is associated with a channel and has a first beginning time and a first ending time. The process further includes identifying a second timer (operation 604). The second timer is associated with the channel and has a second beginning time and a second ending time. The second beginning time occurs temporally before the first ending time and the second beginning time occurs temporally after the first beginning time.

The process further includes identifying a temporal overlap of the two recording timers between the second beginning time and the second ending time (operation 606). The process further includes identifying a dividing time within the temporal overlap (operation 608). The dividing time represents where content from the video stream being recorded will be divided between a first file and a second file. Content being received before the dividing time is stored in the first file and content received after the dividing time is stored in the second file. The dividing time may be identified based on system rules of the DVR or based on user settings depending on desired design criteria. For example, the dividing time may correspond with the ending of one program's time slot and the beginning of another program's time slot. In at least one embodiment, the dividing time may correspond with the first ending time.

The process further includes receiving a video stream associated with the channel using a tuner of the DVR (operation 610). The process further includes recording the video stream between the first beginning time and the dividing time into a first file (operation 612) and recording the video stream between the dividing time and the second ending time into a second file (operation 614).

The process further includes associating a portion of the first file corresponding with the temporal overlap of the first and second timers with the second file (operation 616). For example, the second event file or metadata associated therewith may include a pointer to the overlapping content stored in the first event file. Thus, playback of the second program will include all of the content covering the duration of the second recording timer.

The process further includes receiving input requesting playback of a television program associated with the second file (operation 618). For example, a user may select to view the program from a menu outputted by the DVR. The process further includes outputting first video content corresponding with the portion of the first file responsive to the input (operation 620). In other words, the DVR outputs the portion of the first file corresponding with the video stream broadcast between the second beginning time and the dividing time. The process further includes outputting second video content corresponding with the second file after completing the output of the first video content (operation 622). Thus, the user is presented with all of the content corresponding with the second event time without manually accessing multiple files. The user may also perform trick play mode functions, such as fast forwarding or reversing through any of the content corresponding with the second program during playback.

In other embodiments, the content stored in each of the first file and the second file may vary depending on desired design criteria. In other words, a different dividing time may be selected depending on desired design criteria. For example, the temporal overlap may be split between the two files. Take for example a first timer configured to record from 6:27 and 7:03 and a second timer configured to record from 6:57 and 7:33. The first file may correspond with content between 6:27 and 7:00 (a scheduled ending time of the first program) and the second file may correspond with content between 7:00 (a scheduled ending time of the first program) and 7:33. Thus, the first file may be associated a pointer to the content in the second file between 7:00 and 7:03 and the second file may be associated with a pointer to the content in the first file corresponding with 6:57 and 7:00. Playback of content may then be performed for each event file similarly as described in operations 618 through 622.

Although specific embodiments were described herein, the scope of the invention is not limited to those specific embodiments. The scope of the invention is defined by the following claims and any equivalents therein.

I claim:

1. A method for recording multiple television programs, the method comprising:

identifying a first recording timer on a digital video recorder, the first recording timer associated with a channel and having a first beginning time and a first ending time;

identifying a second recording timer on the digital video recorder, the second recording timer associated with the channel and having a second beginning time and a second ending time, the second beginning time occurring temporally before the first ending time and the second ending time occurring temporally after the first ending time;

receiving a video stream using a tuner of the digital video recorder;

recording the video stream between the first beginning time and the first ending time into a first file;

recording the video stream between the first ending time and the second ending time into a second file; and copying a portion of the first file, corresponding with the video stream between the second beginning time and the first ending time, to the second file after the second ending time.

2. The method of claim 1, wherein the first recording timer is associated with a first television program broadcast during a first time slot, wherein the first ending time occurs after an ending of the first time slot and wherein the second recording timer is associated with a second television program, broadcast during a second time slot, wherein the second beginning time occurs before a start of the second time slot.

3. A method for recording multiple television programs, the method comprising:
   identifying a first recording timer on a digital video recorder, the first recording timer associated with a channel and having a first beginning time and a first ending time;
   identifying a second recording timer on the digital video recorder, the second recording timer associated with the channel and having a second beginning time and a second ending time, the second beginning time occurring temporally before the first ending time and the second ending time occurring temporally after the first ending time;
   identifying a temporal overlap between the second beginning time and the first ending time;
   identifying a dividing time within the temporal overlap;
   receiving a video stream using a tuner of the digital video recorder,
   recording the video stream between the first beginning time and the dividing time into a first file;
   recording the video stream between the dividing time and the second ending time into a second file; and
   associating a first portion of the first file, corresponding with the second beginning time and the dividing time, with the second file by generating a pointer, to the first portion of the first file, in the second file, the pointer specifying playback of the first portion of the first file prior to playback of the video content of the second file.

4. The method of claim 3, wherein the first recording timer is associated with a first television program broadcast during a first time slot, wherein the first ending time occurs after an ending of the first time slot and wherein the second recording timer is associated with a second television program, broadcast during a second time slot, wherein the second beginning time occurs before a start of the second time slot.

5. The method of claim 3, wherein the dividing time corresponds with the ending of the first time slot.

6. The method of claim 3, further comprising:
   associating a first portion of the second file corresponding with the dividing time and the first ending time with the first file.

7. The method of claim 6, further comprising:
   receiving input requesting playback of a television program associated with the second file;
   outputting first video content corresponding with the first portion of the first file from the digital video recorder responsive to the input; and
   outputting second video content corresponding with the second file from the digital video recorder after completing the output of the first video content.

8. The method of claim 3, wherein the dividing time corresponds with the first ending time.

9. The method of claim 3, further comprising:
   receiving input requesting to delete the first file;
   determining whether the second file has been deleted; and
   deleting a second portion of the first file responsive to determining that the second file has not been deleted, wherein the first portion of the first file is retained on the digital video recorder until the second file is deleted.

10. A digital video recorder comprising:
    a non-transitory storage medium;
    a communication interface operable to receive a video stream associated with a channel;
    control logic communicatively coupled to the non-transitory storage medium and the communication interface, the control logic operable to:
       identify a first recording timer associated with the channel and having a first beginning time and a first ending time;
       identify a second recording timer associated with the channel and having a second beginning time and a second ending time, the second beginning time occurring temporally before the first ending time and the second ending time occurring temporally after the first ending time;
       record the video stream into a first file of the non-transitory storage medium between the first beginning time and the first ending time;
       record the video stream between the first ending time and the second ending time into a second file; and
       copy a portion of the first file, corresponding with the video stream between the second beginning time and the first ending time, to the second file after the second ending time.

11. The digital video recorder of claim 10, wherein the first recording timer is associated with a first television program broadcast during a first time slot, wherein the first ending time occurs after an ending of the first time slot and wherein the second recording tinier is associated with a second television program, broadcast during a second time slot, wherein the second beginning time occurs before a start of the second time slot.

12. A digital video recorder comprising:
    a non-transitory storage medium;
    a communication interface operable to receive a video stream associated with a channel;
    control logic communicatively coupled to the non-transitory storage medium and the communication interface, the control logic operable to:
       identify a first recording timer associated with the channel and having a first beginning time and a first ending time;
       identify a second recording timer associated with the channel and having a second beginning time and a second ending time, the second beginning time occurring temporally before the first ending time and the second ending time occurring temporally after the first ending time;
       identify a temporal overlap between the second beginning time and the first ending time;
       identify a dividing time within the temporal overlap;
       record the video stream between the first beginning time and the dividing time into a first file;
       record the video stream between the dividing time and the second ending time into a second file;
       associate a first portion of the first file, corresponding with the temporal overlap of the first and second recording timers, with the second file;
       receive input requesting playback of a television program associated with the second file;

output first video content corresponding with the first portion of the first file from the digital video recorder responsive to the input; and output second video content corresponding with the second file from the digital video recorder after completing the output of the first video content.

13. The digital video recorder of claim 12, wherein the dividing time corresponds with the ending of a first time slot associated with a first program.

14. The digital video recorder of claim 13, wherein the control logic is further operable to associate a first portion of the second file, corresponding with the dividing time and the first ending time, with the first file.

15. The digital video recorder of claim 12, wherein the control logic is further operable to:

receive input requesting to delete the first file;

determine whether the second file has been deleted; and delete a second portion of the first file responsive to determining that the second file has not been deleted, wherein the first portion of the first file is retained on the digital video recorder until the second file is deleted.

16. The digital video recorder of claim 12, wherein the control logic is further operable to:

generate a pointer to the first portion of the first file in the second file, the pointer specifying playback of the portion of the first file prior to playback of the video content of the second file.

17. The digital video recorder of claim of claim 12, wherein the dividing time corresponds with the first ending time.

\* \* \* \* \*